No Printed Specification Available

7400X

M. D. Whipple.
Forming Axe Eyes.

Patented Jan. 31. 1833.

7400X Jany 31, 1833 Cr 16

Milton D. Whipple of Douglas Massachusetts

Letters Patent.

The schedule referred to in these Letters Patent and making part of the same containing a description in the words of the said Milton D. Whipple himself of his improvement in the method of forming or making the eyes of axes, by drilling the same, — To all people to whom these presents shall come Be it known that I Milton Dexter Whipple, of Douglas of the County of Worcester and Commonwealth of Massachusetts, Machinist, have invented a new and useful improvement in the method of making or forming the eyes of axes by drilling out the same, and that the following is a full and exact description of the construction and operation of the said machine as invented or improved by me.

The machine may be made of iron, wood, or of any material suitably strong and firm, the frame of the machine is of the form of a parallelogram, being composed of four pieces of wood or iron firmly joined together.

The part of the frame that unites the top of it is not directly over the corresponding part at the bottom, but for the sake of convenience is placed a little back of it.

At a convenient distance from the bottom of the frame, is a slat firmly tenoned into the sides of the frame and like that which unites or connects the sides of the frame at the bottom. Through the bottom of the frame and through this slat are two holes in each the holes in the slat being directly over those in the bottom of the frame. At the top of the frame and in the right hand corner as you stand fronting the machine is a rod with the lower end of it resting upon a stand attached to the side of the frame at a convenient distance from the top; the upper end of this rod is confined in like manner to another stand, attached to the top of the frame and at a convenient distance from the side, so that the rod has the position of a brace, making an angle with the side and top of the frame, Near the top of this rod, the axe is confined and held firmly while the eye is drilled out. Through the holes in the slat and bottom of the frame are two bolts of iron, these are called stops, and are similar to each other and are placed upright. Both are moveable up and down. Between the slat and bottom is a bar of iron parallel

[illegible]

[illegible] 7400X with them, with a hole in each end corresponding precisely with the holes in the slat and
bottom through which the steps are passed or inserted.
This bar is moveable up and down on the steps and confined at pleasure by means
of screws answering as keys. Through the centre of this bar, and between the steps
is a stationary screw, that is, a screw having only a revolving motion without
moving forward or back, There is a thread in the central hole through
the bar or screw cut to receive the stationary screw, so that by turning the stationary
screw, the bar which is passed through is raised or depressed according to the direction
given to the stationary screw, and this screw is kept in its place or kept from rising
when turned, by means of the slat, On the top of the right hand step, rests
the foot of the stock which holds the drill, Near the foot of the stock and upon it is
cut an endless screw, the threads of which play into or receive the leaves of a pinion
~~wheel~~ which will be hereafter mentioned, Above this endless screw and
firmly attached to the stock is a wheel or drum, for the band connecting the machine
with the moving power, Above the drum is a wide slot in the stock for the
convenience of putting in and taking out the Drill. From the top of the stock
to the top of the slot is a hole for the drill. This hole is not parallel with
the sides of the stock or perpendicular, but passes through obliquely, so that when
the stock revolves, the point of the drill instead of turning on a point, describes
with its point a small circle. This drill is firmly held in the stock by
means of a screw, and when the drill is put into the stock, it is inserted with its
most prominent cutting point directly against that part of the stock where the
screw enters; and the screw is inserted centrally on the largest side of the stock,
Above the slat and on the back side of the machine and resting on boxes or arms
attached to both sides of the frame is a shaft upon the right hand end of which is a
pinion, the leaves of which are received upon the leaves or threads of the endless screw
on the foot of the stock before mentioned, Upon the opposite end of this shaft is another endless screw, moving another pinion which is attached to the lower end of
an upright shaft on the other side of the frame, This upright shaft is of equal
length with the stock; Near the upper end of this shaft, it is so bent
or crooked that when it revolves, it drives the motion made by a crank.
The lower end of the crank part of this shaft describes in revolving, a larger circle
than the upper part, The diameter of the larger circle thus described is equal

7400X to the greater width of the eye of the axe in the direction from the edge to the head or
back of the axe and the diameter of the smaller circle or that made by the upper part
of the crank, is equal to the width of the eye, in the direction from the center of the edge
of the axe to the center of the back or head of the axe. To that part of the shaft
which composes the crank, is attached a sweep placed horizontally the other end
of which on the right hand of the machine is attached to the upper end of the stock
above the slot — upon this last end of the sweep is a slot through which passes
the rod before named, so that this sweep moves the drill [the drill being in
the stock] over all parts of the surface of the eye of the axe, ——
Upon the left hand step and resting upon the upper end of it, is an upright sweep
and is called the second sweep; upon the upper end of which rests the end of the
first sweep next to the crank. —— The purpose of the second sweep is to sustain
or support the end of the first sweep. Upon the top or upper end of the stationary
screw, is a ratch wheel, and directly beneath this wheel and moveable on the neck
of the stationary screw, is an arm, and upon that part of the arm which is on the front
side of the stationary screw is a post into which is fixed a dog for the ratch. ——
To this post or to the arm is attached one end of a spiral spring, and the other
end is attached to the side of the frame, —— Below the pinion on the foot
of the upright shaft, is an arm passing through the shaft opposite to the end of the
arm on the neck of the stationary screw, —— Explanation of the Drawing
Fig II. W. upright shaft. a.a. crank on the shaft. C. pinion, d. arm passing
through the foot of the shaft. b. second sweep. j. stock holding the Drill
m. slot in the stock for the convenience of changing the Drill. n.n. Drill
passing obliquely through the stock. i screw to hold the drill firmly in the
stock, q. apparatus to hold the axe during the process of drilling. n. Drill
k. arm on the neck of the stationary screw, s. place of the dog for the ratch
wheel showing where the spiral spring is attached to it. x. screw that holds
the drill.

Explanation of the Drawing —

Fig I. A.B.C.D. Frame of the machine, a. shaft f.f. steps the right
hand one supporting the drill and stock, and the left hand one supporting
the second sweep. q.q.q. bar of iron through which the step pass. h. stationary
screw, i.i. screws answering as keys to confine the steps f.f. in the bar
q.q.q. j stock holding the drill. k. Drum or wheel for the band connecting the machine with the moving power. l. screw or spiral thread connect
-ed with the pinion, r. m. slot in the stock for the convenience of changing the
drill. n.n. drill, o.o. Rod passing through the slot in the first sweep.
p. Axe confined for the process of Drilling q. apparatus for firmly holding
the axe, r. pinion on the shaft S. u. Spiral thread or endless screw on the
shaft S. z pinion on the upright shaft W. V. arm on the shaft W. W. up
right shaft. x crank part of the shaft W. a, first or horizontal sweep
t. slot in the first sweep for the rod. b. second sweep, c. ratch wheel
on the stationary screw, d. arm moveable on the neck of the stationary
screw, m.m. Spiral Spring to bring back the arm d. when moved
by the arm V. Operation of the Machine, The drawing Fig I represent the machine as it is when the drill is at that
part of the axe nearest the edge. The band connecting the machine with the
water power passing over the drum or wheel represented by k, when the ma
chine is put in motion, the stock j, holding the drill n. n is made to
revolve, and as the endless screw l. is a part of the stock j, it revolves with it.
The endless screw plays into the leaves of the pinion r. attached to the horizon
tal shaft, S. and the shaft S, is made to revolve, and as the endless screw u, is
attached to the shaft S. this endless screw also revolves, The endless screw u
plays into the leaves of the pinion z, and turns the upright shaft W,
and as the shaft W. turns the arm V. near the foot of it one end of the arm
V. is brought in contact with the bend (t Fig 2) in the arm d and this motion
throws the arm d. back. As the arm d. is back, the ratch wheel c. which
is attached to the stationary screw, h is carried forward, the dog attached to
the post resting on the arm d, as represented in S.

[illegible]  7400X

Figure 1:
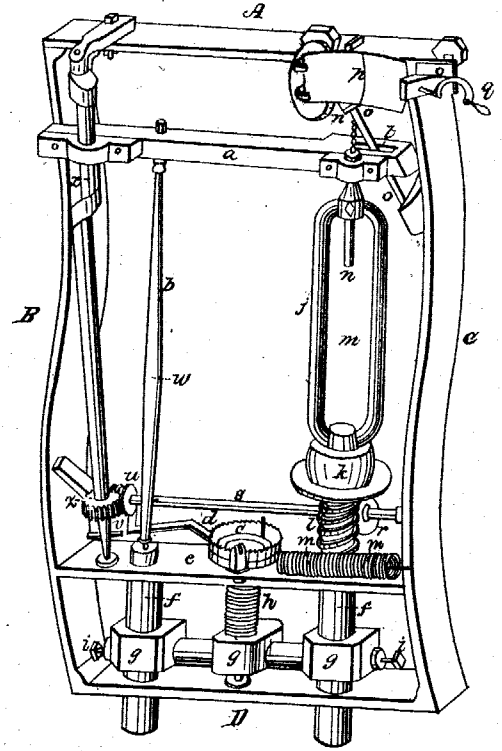
Figure 2:
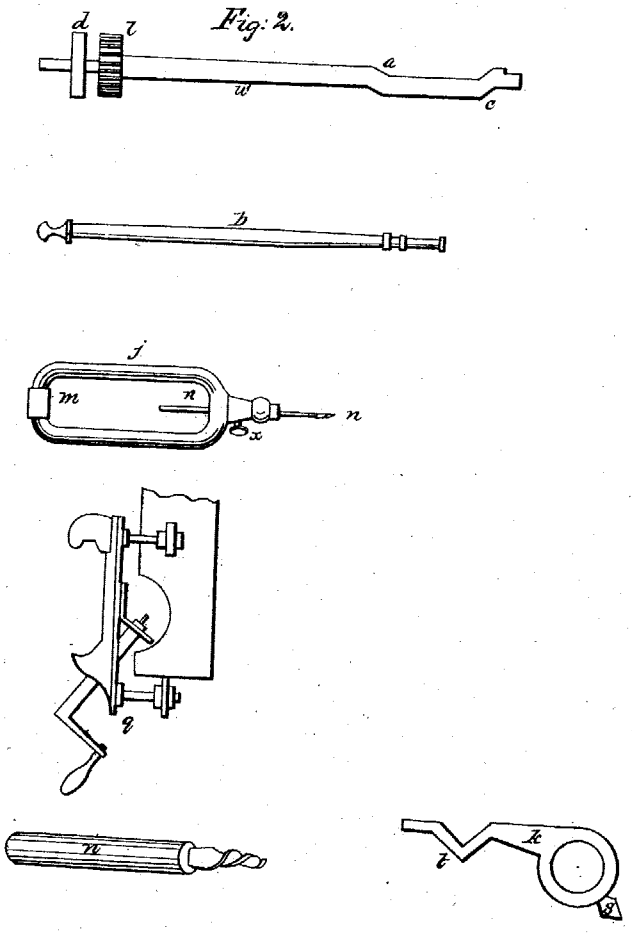
Fig 2, catches into the
ratch wheel so carried forward and there holds it. And as the arm d. is
moveable round the neck of the stationary screw h. and when the arm V. has
crowded the arm d back, the arm d [the arm V having passed by] is
suddenly restored to its former position by means of the spiral Spring m.m,
When the arm d was crowded back by the arm V by the revolving of the
upright shaft W. the ratch wheel c, by means of the dog [this dog moves with
the arm d, being a part of it] was carried forward and as the ratch wheel is
firmly attached to the top of the stationary screw, this stationary screw is made to perform a part of a revolution, and as there is a thread or screw cut in the bar
g.g.g. at the middle g. and as this stationary screw rests with its end upon
the bottom of the frame, and as the slips f.f. are moveable up and down through
the slat e and bottom of the frame, the bar g.g.g. & therefore the slips f.f.
because confined to the bar by means of the screws i,i, were all raised upward.
And as the stock j rests upon the top of the right hand slip f. the stock j was
raised upward at the same time, and consequently the drill n.n. And the
second sweep b. which rests upon the top of the left hand slip f. was raised
upward in the same manner. and this constitutes the feed or the motion of the
drill into the eye of the axe, I will now describe the manner by which the drill is made to traverse
and cut over all parts of the eye equally. The eye of the axe is made tapering
or conical both ways to the centre. This is its usual shape and is so formed
for the convenience of holding or wedging in the helve or handle, My machine
is so constructed as to give this form to the eye, The lower end of the crank X. on the shaft W. describes when it revolves
a larger circle than the top or upper end of it; during the process of drilling
half the eye of an axe, the first sweep a. which is placed horizontally slips
or is raised upwards on the crank X. by means of stationary screw h a
distance equal to half the width of the axe I now suppose the machine to be in the same position as when the first
operation of it began because the motion now to be described was per-
formed at the same time with that, as the shaft S. revolves. the upright
shaft W. begins to revolve in like manner, and the first sweep a being at-
tached to the crank X on the shaft W as the shaft W turns the stock j. &
consequently the drill n.n, is carried from that part of the eye next to the
edge of the axe, towards the head or back of the axe - and the drill traverses
so the whole width of the eye in half of a revolution of the shaft W. And at
each successive semirevolution of the shaft W, the first sweep a, by means of
the stationary screw h being raised upwards, a smaller circle is described
by that particular part of the crank X occupied by the first sweep a, and con-
sequently a smaller circle is passed over by the drill, and in this way as the first sweep
a rises on the crank X. the eye of the axe is diminished in thickness or made tapering

The end of the first sweep a next to the drill n n is kept in its place by the rod o o in the slot t and in consequence of the sweep a turning on the rod o o. and the sweep a being raised by each semirevolution of the shaft W and the inclined or oblique position of the rod o o the length of the sweep a is constantly diminishing, and with it the space or surface passed over by the drill n n. And these two motions together produced by the shape of the crank X. and the inclined position of the rod o o from the eye of the axe tapering both in breadth and thicknefs By making the crank X. regular and placing the rod o o perpendicular, the eye would be of uniform breadth and thicknefs. When the machine has carried the drill one half way through the eye of the axe, the dog on the ratch wheel is raised, and by means of a weight attached to a rope or chain which is wound round the ratch wheel, the stationary screw is turned in opposite direction to that produced by means of the motion given it by the machine, and the steps f.f. the bar g g g. the two sweeps a & b the stock j and the drill n n are let down to their original position. The axe is then taken out and turned over, and the dog replaced upon the ratch wheel, and the procefs of drilling again commenced as before, and the other half completed in the same way.

All I claim in this specification as my invention or improvement is the application of machinery in carrying forward the drill to the drilling out the eyes of axes in proper shape, In witnefs whereof I have hereunto set my hand this twenty eighth day of November, one thousand eight hundred and thirty two Witnefses
Christopher Columbus Baldwin
Jubal Harrington Milton D. Whipple 2960 [illegible]
drawing [illegible]

[illegible] portfolio

[illegible]
Chy W.